United States Patent Office 2,901,014
Patented Aug. 25, 1959

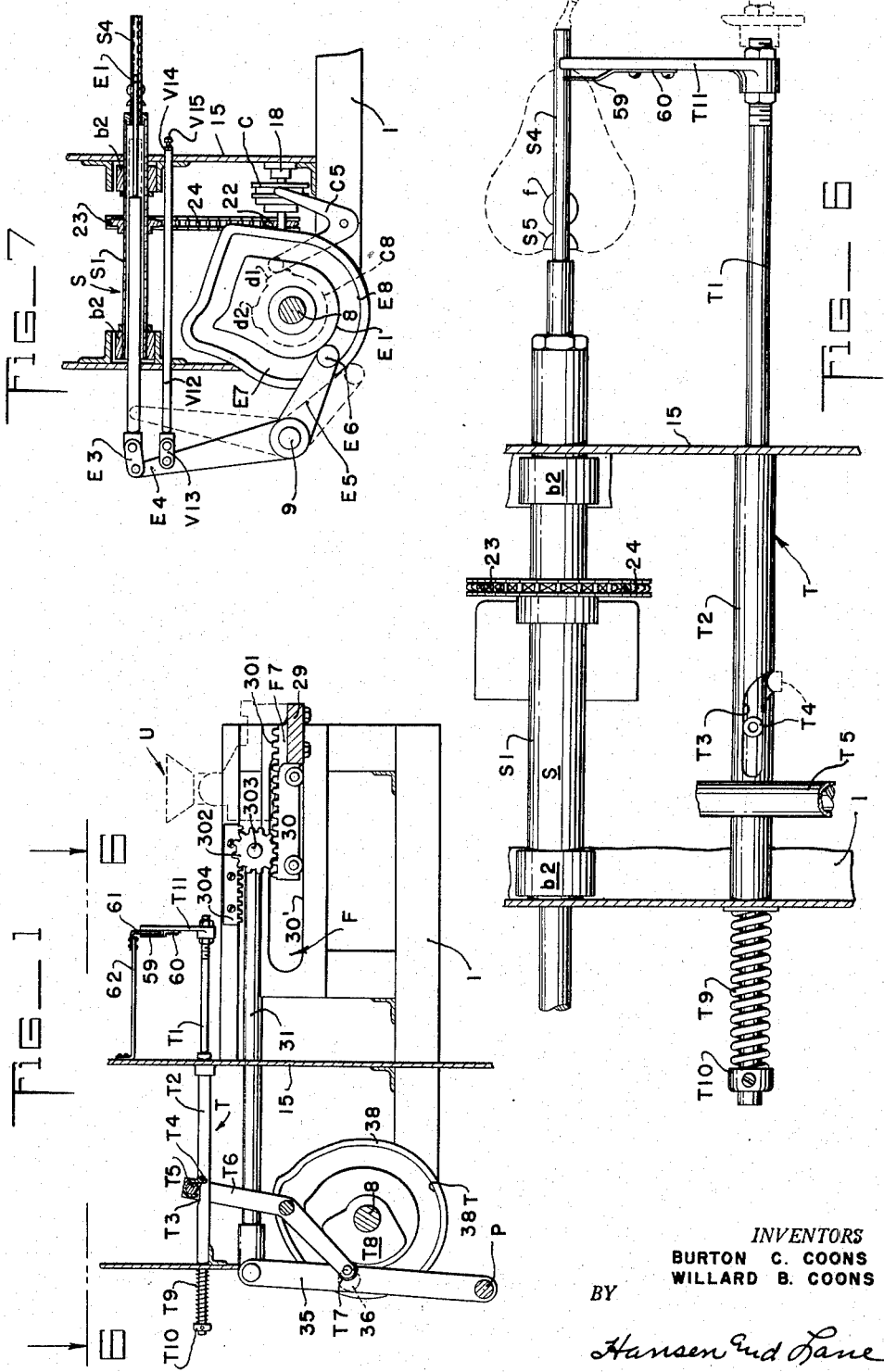

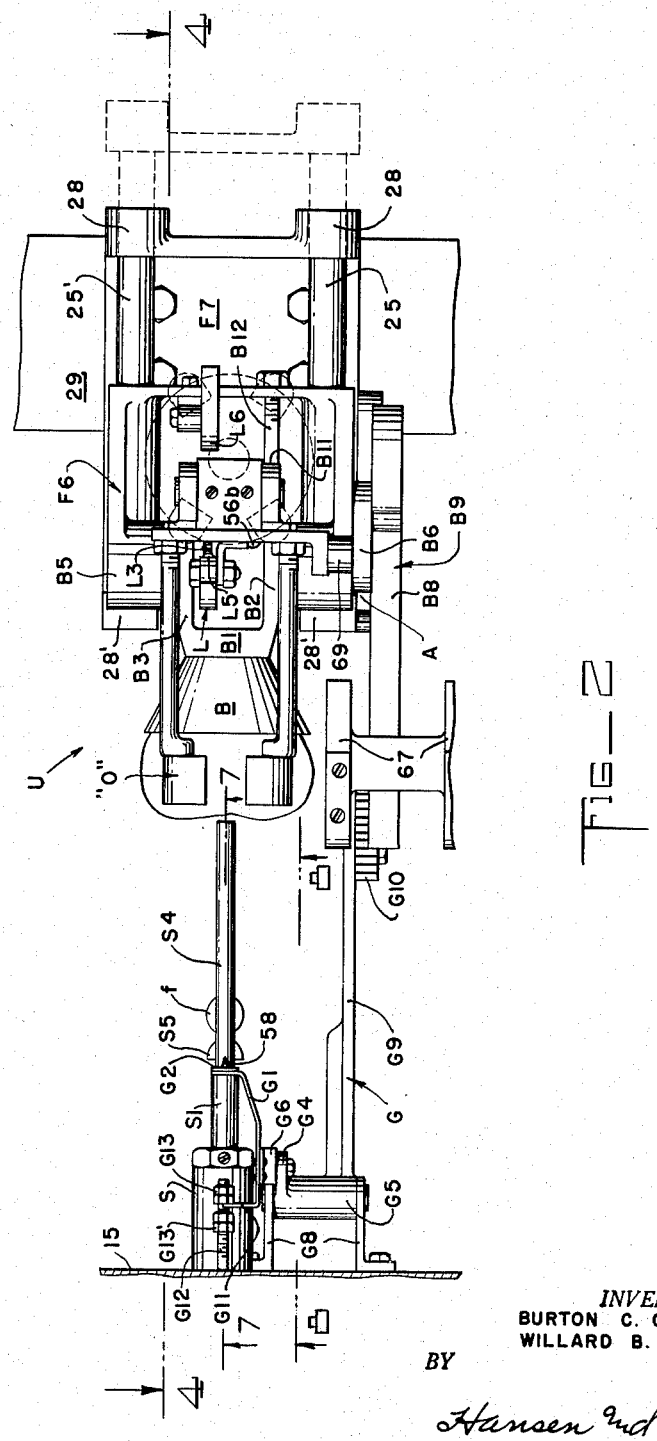

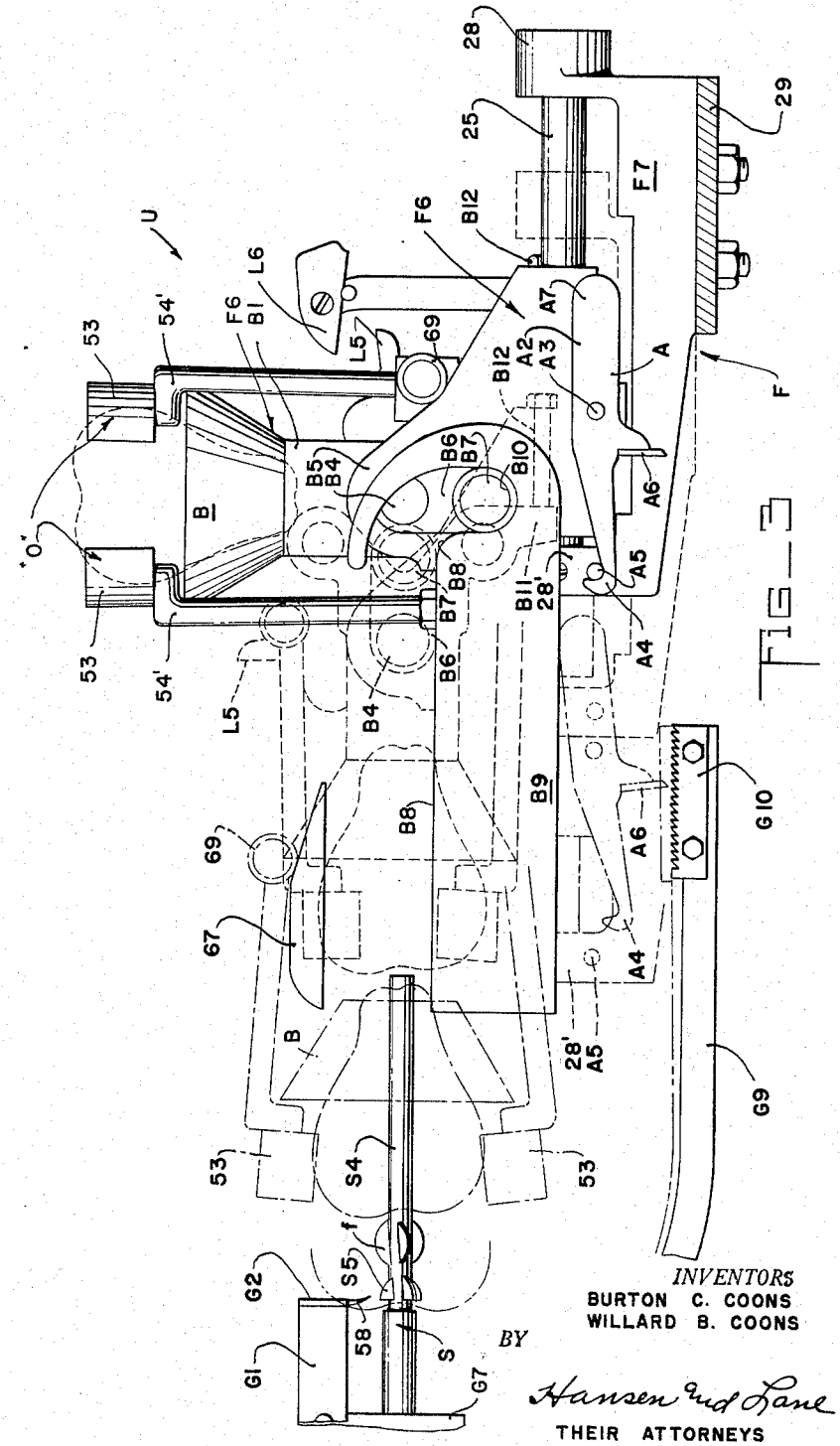

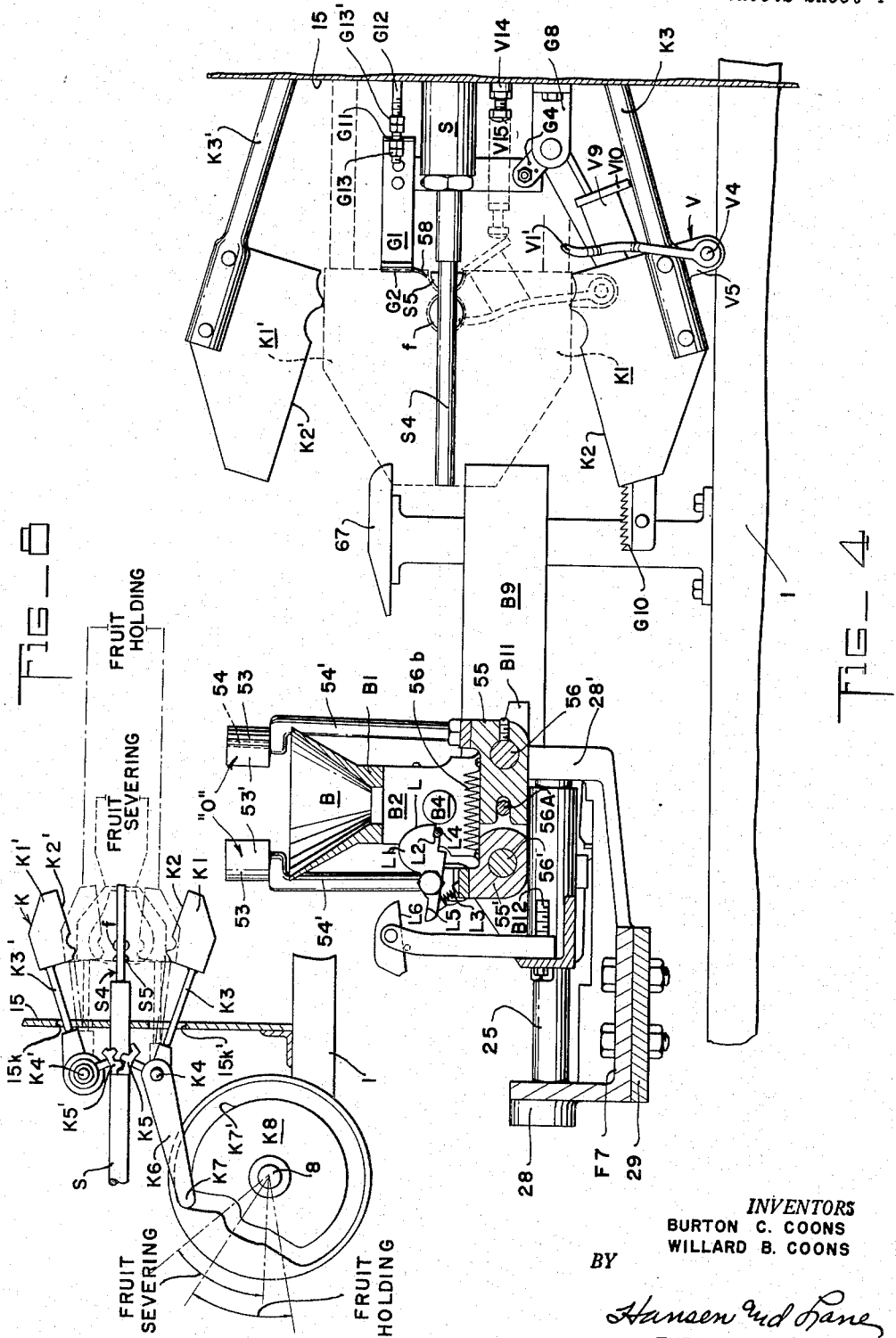

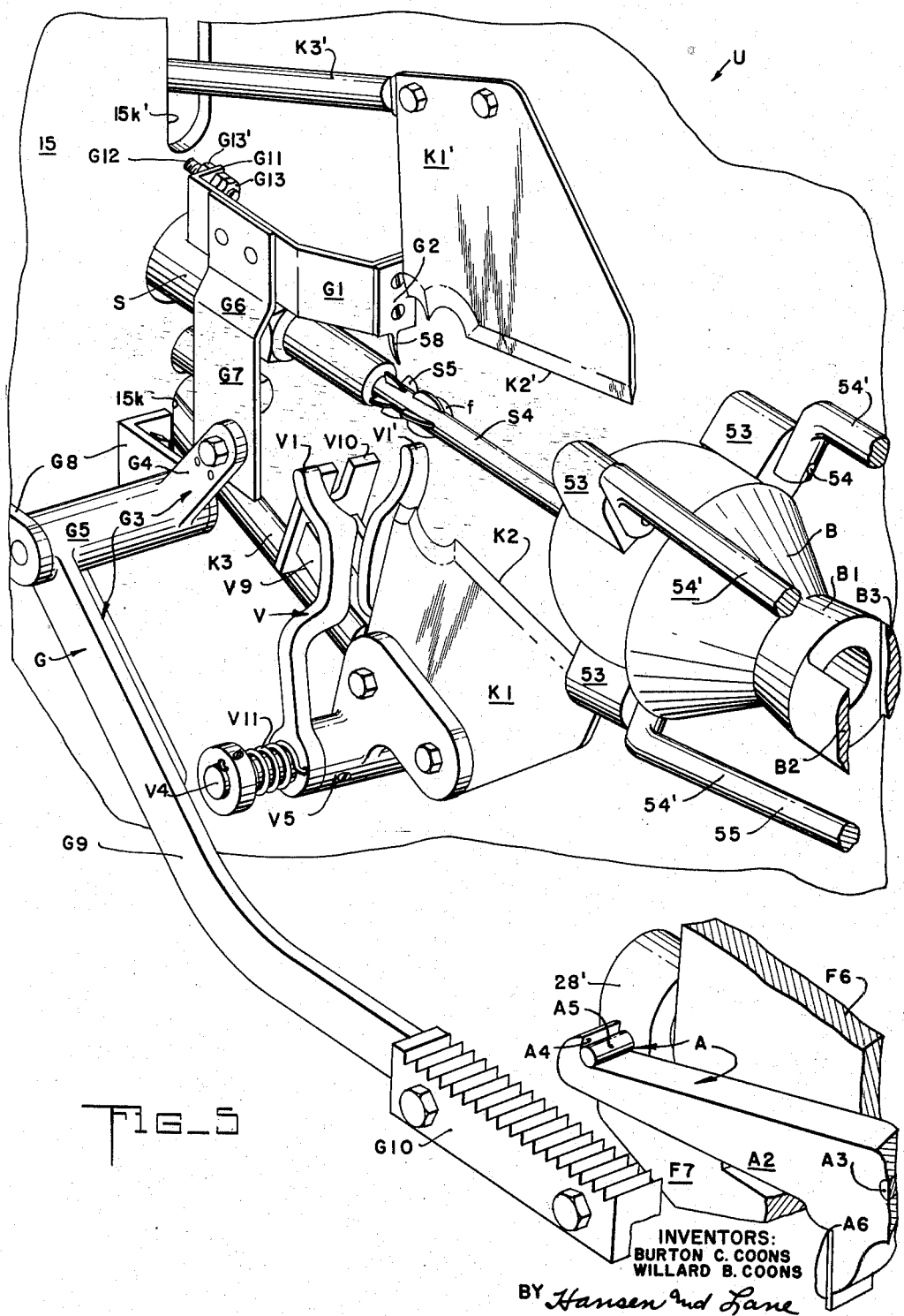

2,901,014

FRUIT FEEDING, END TRIMMING, HALVING AND KNOCK-OFF MECHANISM

Burton C. Coons, San Jose, and Willard B. Coons, Santa Clara, Calif.

Application August 2, 1954, Serial No. 447,076

18 Claims. (Cl. 146—72)

This invention relates to apparatus for preparing fruit such as pears for preservation by canning. More particularly this invention relates to certain novel improvements in the feeding, trimming and removal of a pear relative to a fruit preparing apparatus.

The invention herein is associated with a pear preparation machine of the type shown, described and claimed in our copending application, Serial No. 279,428, filed in the United States Patent Office March 29, 1952, which issued as Patent No. 2,742,067 under date of April 17, 1956. In general, this prior application discloses a machine in which a pear fed onto a relatively stationary rotatable spindle is trimmed, peeled, cored, seed celled and halved during each cycle of operation of the machine. In this connection the machine embodies a common drive shaft for turning and dwelling the fruit supporting spindle in timed relation with the operation of mechanism for trimming, peeling, coring, seed celling and halving the fruit as well as means for feeding a fruit onto the spindle once in each cycle of operation. This entails means for gauging the size of each pear as it is impaled upon the spindle and the uncoupling of the feed mechanism relative to its positive connection to the common drive shaft so that each pear ceases to advance relative to the spindle when the seed cell zone of the pear registers with radial fins on the spindle. In other words, each pear is advanced to a position on the spindle wherein the seed cell zone of the fruit registers with the fins on the spindle irrespective of the length of the fruit.

The present invention contemplates the same broad general concept but is more particularly directed to certain improvements in the feed mechanism and manner of gauging the size of a pear being fed onto the spindle. This invention further contemplates an improved coupling on the feed mechanism together with a trip mechanism associated with the fruit gauging means.

Another object of this invention is to provide a feed cup for receiving a pear fed into the same by hand and for impaling such pear on the fruit supporting spindle during a temporary dwell in the turning thereof.

It is a further object to provide means for gauging the length of the fruit being fed onto the spindle and trip mechanism for promptly staying advancement of the pear upon register of its seed cell zone with the fins on the spindle.

Another object is to provide a novel stem end trimmer and clean-out therefor operable in timed relation with the spindle and feed mechanism.

Yet another object is to provide means for positively removing pear halves from the spindle subsequent to halving of the fruit by pear halving knives which oscillate toward and from the spindle once in each cycle of operation of the machine.

These and other objects and advantages of the present invention will becomes apparent from a reading of the following description and claims in the light of the drawings herein presented in which:

Fig. 1 is a fragmentary longitudinal section through a pear preparation machine embodying the present invention to show in particular the common drive for the feed mechanism and stem end trimmer thereof.

Fig. 2 is an enlarged fragmentary top plan view of the feed mechanism in relation to the pear supporting spindle of the machine.

Fig. 3 is an enlarged fragmentary side view of the mechanism illustrated in Fig. 2 to illustrate the advancement of a pear onto the spindle by the feed mechanism.

Fig. 4 is a longitudinal fragmentary section through the mechanism shown in Fig. 2 as seen from line 4—4 therein but turned end for end and with parts thereof in a different position.

Fig. 5 is an enlarged fragmentary perspective view of one fruit preparing unit about to receive a pear on its spindle.

Fig. 6 is an enlarged fragmentary plan view of the stem end trimmer of Fig. 1 as seen from lines 6—6 therein.

Fig. 7 is a longitudinal fragmentary section on the same scale as Fig. 1, taken as along line 7—7 of Fig. 2 to illustrate the core ejecting feature as well as the fruit half knocked-off push rod operable therewith.

Fig. 8 is a longitudinal vertical fragmentary section on the same scale as Fig. 1, taken along line 8—8 of Fig. 2 to illustrate the fruit halving knives and their connection to the common drive shaft.

In the drawings, the pear preparation apparatus includes a frame 1 within which a common drive shaft 8 is suitably journaled for turning by means of a source of power such as an electric motor or the like (not shown) in any manner well known in the art. This drive shaft 8 is preferably arranged in a drive compartment behind a vertical partition 15 supported on the frame 1.

In the drawings of the present application only one fruit handling unit U is shown, it being understood that several such units can be arranged in bank, side by side relative to the frame 1 and partition 15 for operation by the common drive shaft 8. Each unit U includes a spindle S, a feed mechanism F (Fig. 1), and fruit halving knives K (Fig. 8) all of which operate in timed relation with each other by cam or clutch connection C (Fig. 7) with the common drive shaft 8. A usual peeling knife, not shown, may be incorporated with the fruit handling unit of the present invention in the manner described in our copending application mentioned previously herein.

The spindle S comprises a tubular shaft S1 journaled in bearings b2 behind the partition 15 with its fore end extending through the partition in the form of a coring tube S4 forwardly of the partition. The spindle shaft S1 has a sprocket 23 secured thereto round which a chain 24 is trained for driving connection with another sprocket 22 floating on a shaft 18 secure to a clutch C. The clutch C is continuously driven with the common drive shaft 8 but meshed with the sprocket 22 periodically by operation of a dog leg lever C5 pivoted on the frame 1 and having its opposite arm controlled by a cam C8 secured to the shaft 8. The cam C8 has an acclivity $d1$ for causing the clutch C to disengage the sprocket 22 for approximately ⅛ of a cycle and another acclivity $d2$ for disengaging the clutch C just prior to the major dwell afforded by the acclivity $d1$. In this manner the spindle S is turned the major portion of the time but caused to dwell ($d1$) once when one pear is removed therefrom and another pear is impaled thereon and again ($d2$) when the halving knives K enter the fruit.

The coring tube S4 of the spindle includes a plurality of fins $f$ disposed along the length of the tube S4 so as to register with the seed cell zone of a fruit impaled thereon. The fins $f$ are arranged in radial array about the tube S4 within a spherical zone comparable to the seed cell zone of a fruit. The tube S4 also carries a plurality of fin-like blades S5 of substantially triangular shape to the rear of the fins f for trimming the blossom or calyx end of the fruit in the form of a countersunk recess. Here it should be noted that for purposes of convenience in locating or qualifying the various elements of the machine herein described, its feed end (right-hand end as shown in Figs. 1, 2 and 3) shall be considered as its forward end and that any element qualified as extending forwardly shall be deemed to mean that such element extends towards the front end of the machine. In other words, the front or feed end of the machine shall hereinafter be used as a reference point with respect to location or direction.

The feed mechanism F is arranged forwardly of the partition 15 in direct alignment with the coring tube portion of the spindle S extending forwardly therefrom. As best seen in Fig. 1, the feed mechanism F includes a flat bed casting F7 secured to a cross bar 29 having its ends secured to riders 30 on each side of the frame 1. Each rider 30 is guided for movement in a track 30' mounted on the frame and carries a rack 301 engaging a pinion gear 302 keyed to a pin 303 extending laterally from and journaled in a guide rod 31. The pin 303 carries another gear (not shown) engaging a rack 304 secured to the frame 1 in such a manner that the rack 301 and flat bed F7 move at a relatively greater speed than the normal speed of movement of the guide rod 31 upon operation thereof. The guide rod 31 has its opposite end pivotally secured to the free end of a lever 35 the opposite end of which is pivoted as at P to the frame 1. This lever 35 carries a roller 36 which rides in a track 38T of a cam 38 secured to the common drive shaft 8.

With the foregoing arrangement, the flat bed F7 is caused to reciprocate toward and from the partition 15 once during each cycle of operation of the machine. It should here be noted that the cam track 38T is so configured that the flat bed F7 of the feed mechanism F is withdrawn relative to the spindle S for a greater period of time but to move the carriage toward the spindle S during the major dwell thereof during disengagement of the clutch C by the acclivity d1 in the cam C8.

Referring now to Figs. 2, 3 and 4, the bed casting F7 has fore and aft bosses 28 and 28' respectively at its four corners. These bosses support guide rods 25 and 25' which extend from the said fore to aft bosses on either side of the flat bed F7. A feed carriage F6 is mounted for sliding movement on the guide rods 25 and 25' in such a manner as to afford lost motion between the positively moved flat bed F7 and the feed carriage F6. When the flat bed F7 is completely withdrawn relative to the spindle S as shown in Fig. 4 the feed carriage F6 is at its foremost position on the guide rods 25—25' and relative to the flat F7. In this position, see Fig. 3, the feed carriage F6 is coupled to the flat bed F7 for pear advancing movement therewith by a coupling mechanism A.

The coupling mechanism A (Figs. 3 and 5) consists of a lever arm A2 pivotally mounted midway its ends on a pin A3 projecting laterally from the feed carriage F6. The aft end of the lever arm A2 is hook shaped as at A4 on its upper end to latchingly receive a pin A5 extending laterally from the aft boss 28' on the flat bed F7. The opposite or fore end A7 of the lever arm A2 serves as a counterweight normally tending to rock the lever arm A2 (clockwise Fig. 3) into a position to maintain its hooked end A4 in latching engagement with the pin A5 on the flat bed F7 to thereby couple the feed carriage F6 to the flat bed F7 for movement toward the spindle therewith. However, upon rocking movement of the lever arm A2 (counterclockwise Fig. 3) the hooked end A4 disengages the pin A5 to thereby uncouple the feed carriage from the positively moved flat bed F7 so that the latter can complete its full stroke toward the spindle although the feed carriage is free to stop due to any resistance against its normal advancement.

The feed carriage F6 carries a fruit receiving and supporting cup or bell B which is formed integrally with an oscillating yoke B1. This yoke B1 is of inverted U shape having side legs B2 and B3 extending downwardly from its bight with which the bell B is integrally formed to flare outwardly and away from the bight and legs of the yoke B1. These legs B2 and B3 have aligned trunnion pins B4 extending laterally therefrom and journaled in spaced bosses B5 formed integrally with the feed carriage F6. The axes of the trunnion pins B4 extend transverse with respect to a line extended forwardly from the axis of the spindle S so as to lie in the same horizontal plane therewith but perpendicular thereto.

The trunnion pin B4 on one side of the yoke B1 extends beyond the boss B5 within which it is journaled and has a crank arm B6 secured thereto. The free end of this crank arm B6 carries a roller B7 which rides in a track B8 (Fig. 2) of a cam bar B9 which is secured in a stationary position on the frame 1 alongside the path of reciprocation of the feed carriage toward and from the spindle S.

When the feed carriage is withdrawn relative to the spindle and cam bar B9 the roller B7 is disposed in a declivity B10 in the cam track B8. However when the feed carriage F6 is advanced toward the spindle S the roller B7 rides up onto the level portion of the cam track B8 to rock the yoke B1 rearwardly to dispose the cup or bell B in axial alignment with the spindle S. It should be noted in Fig. 3 that the crank arm B6 is straight downward when the roller B7 is in the declivity B10 of the cam track. However, upon advancement of the feed carriage F6 toward the spindle S, the axis of the trunnion pins B4 being above the level portion of the cam track B8 causes the yoke B1 to tilt toward the spindle simultaneous with movement of the feed carriage toward the same.

From the foregoing it will be appreciated that a pear can be manually deposited stem end first into the bell shaped cup B when the latter is disposed axially erect while the feed carriage F6 is in its withdrawn position.

Referring now to Fig. 4, it will be noted that the oscillating yoke B1 has a fruit centering means "O" operatively associated therewith. The fruit centering means "O" comprises a set of fruit engaging pads each of which pad is designated 53 having a flat inner face 53' adapted to engage the bulb end of a pear supported in the cup B as above explained. Each of these pads 53 is loosely mounted for slight swinging on an upstanding pintle 54 on the shouldered upper end of a rod 54' of which there are preferably four. These rods 54' are in pairs 55 and 55' fore and aft of the cup portion B of the feed carriage (Fig. 5). The pair 55 of rods 54' are supported on a cross shaft 56 for swinging movement toward and from the aft end of the cup B while the other pair 55' are similarly mounted on a cross shaft 56' at the fore side of the cup B. These cross shafts 56 and 56' are supported transversely between the legs B2 and B3 of the yoke B1 on that side of the trunnion pins B4 which is opposed to the cup B. As previously stated, the rods 54' are in pairs, that is to say, formed on a single bushing for rocking movement together relative to their respective cross shaft 56 or 56'. These two pairs of rods 55 and 55' are linked together as at 56a for simultaneous movement toward and from the cup B. A tension spring 56b anchored to the base of each pair of rods 55 and 55' serves to normally urge them toward each other so that the several rods in effect close in upon the cup B causing the several pads 53 at the upper ends of the rods 54' to embrace the bulb end of a pear in the cup to position such pear with its stem to blossom axis coincident to the axis of the cup B.

During manual placement of a pear into the cup B in the manner above explained, it will be apparent that the several pads 53 of the fruit centering means "O" must be held in their extreme open position outwardly and away from the cup B so as not to obstruct the admission of a pear into the same or bruise the pear while it is placed in the cup. To this end, means L is provided for latching the two pairs of rods 55 and 55' in open position against the action of the spring 56b by which they tend to close. The latch means L comprises a latch dog L1 pivotally mounted on the bushing of the foremost pair of rods 55'. This dog L1 has a keeper ledge L2 at its aft end spring urged downwardly by a compression spring L3 between its aft end and the adjacent bushing so as to latchingly engage a pin L4 extending from one leg B2 of the yoke B1. In this manner the fruit centering means "O" is held in open or non-effective position during the time the operator feeds pears into the cup B. However, immediately upon rocking movement of the yoke B1 and feed cup into axial alignment with the spindle S the tail end L5 of the latch dog L1 strikes a release pawl L6 to compress the spring L3 and unseat the pin L4 relative to the keeper ledge L2 on the dog L1 whereupon the tension spring 56b snaps the two pairs of rods 55 and 55' inwardly so that the pads 53 engage the bulb end of the pear to center the same relative to the cup B. It should here be noted that since the pads 53 are loosely mounted for slight swinging on the pintle ends 54 of arms 54', the flat faces 53' on the pads 53 will assume tangential relation with respect to the round surface of the pear which they engage. As a consequence of this action, the pear will be properly aligned with its stem-blossom axis coincident to the axis of the cup B. Moreover, since the cup now assumes a position with its open bell facing the spindle (sidewise) the spring urged rods 54' and their pads 53 serve to maintain the pear within the cup B prior to impalement of the pear on the spindle. Rocking movement of the oscillating yoke B1 from vertical to horizontal position is limited by abutment of a lip B11 on the aft part of the yoke B1 with a stop pin B12 on that portion of the feed carriage F6 which does not oscillate (see Fig. 4 and dotted line in Fig. 3).

As the feed cup B advances toward the spindle by reason of coupled relation of the feed carriage F6 with the flat bed F7 the calyx end of the pear is pierced by the sharpened open end of the tubular shaft S4. Continued movement of the pear onto the spindle S causes the core fibers to enter the tubular shaft S4. As soon as the pear is well supported on the spindle S, the stem end of the pear being yet supported in the base of the bell shaped cup B, the centering means "O" can be released relative to the fruit. This is depicted by dotted lines in Fig. 3 wherein it will be noted that a release cam 67 is stationarily supported on the frame 1 (Figs. 2 and 4) in a position to be engaged by a roller 69 journaled on a stud shaft extending laterally from the foremost pair 55' of rods 54'. In this manner the two pairs 55 and 55' of rods 54' are cammed into open condition against the action of their tension spring 56b and relative to the cup B until the keeper ledge L2 of the dog L1 again receives the pin L4 to latch the centering means in open or fruit receiving position.

A gauge or sensing means G (Figs. 1, 2 and 5) cooperates with the feed mechanism F for detecting complete impalement of a pear upon the spindle and functions automatically to release the coupling mechanism A, hereinbefore described, between the feed carriage F6 and the flat bed F7. As best illustrated in Fig. 5 the gauge means G includes a fruit engaging pad G2 and a trip mechanism G3 operable by a pear when it is fully impaled upon the spindle to uncouple the feed carriage F6 from the flat bed F7 of the feed mechanism F.

The trip mechanism G3 includes a boss G5 rockably supported on trunnion ears G8 extending forwardly from the partition 15 to the left of and below the axis of the spindle S as seen from the front of the machine. A lever G4 extends upwardly from the boss G5 to the left of the spindle S and a leg member G7 is secured to the lever G4. This leg member G7 has its upper end offset as at G6 to extend over the spindle S and carries a forwardly projecting gauge block G1 to which the fruit engaging pad G2 is secured directly above the fin-like triangular blades S5 on the tubular shaft S4. That end of the block G1 closest to the partition 15 has an inwardly projecting fork G11 formed thereon to straddle a limit pin G12 extending forwardly from the partition. This limit pin G12 has a pair of nuts G13—G13' on either side of the fork G11 to limit movement of the latter relative to the trunnion support afforded the boss G5 by the trunnion ears G8. The pad G2 and its supporting block G1 are normally urged forward by the weight of an elongated arm G9 which extends forwardly from the boss G5. Downward movement of the arm G9 by gravity is limited by engagement of the fork G11 with the foremost pair of nuts G13 on the limit pin G12.

With the arm G9 of the trip mechanism G3 in the foregoing position the free end of arm G9 is below the plane of the hooked aft end A4 of the coupling mechanism A (see Figs. 3 and 5) as the pear becomes impaled upon the tubular shaft S4. The free end of the arm G9 has secured thereto a barbed pad G10 adapted to be engaged by a blade A6 depending from the coupling lever arm A2 just aft of its mounting pin A3. While pad G10 is in its normal lower position as limited by the fork G11 and foremost nuts G13 on the limit pin, the barbed pad G10 will not be engaged by the blade A6 on the coupling lever A2. However, when the calyx end of the pear engages the detector pad G2 of the gauge means G the elongated arm G9 is raised to position the barbed pad G10 for engagement by the blade A6.

The upper surface of the barbed pad G10 has a series of closely spaced saw tooth formations so disposed that any one tooth will engage the blade A6 when the pad G10 is raised. In this manner, irrespective of the length of the pear being impaled upon the spindle shaft S4, as soon as the calyx end of a pear engages the detecting pad G2 of the gauging mechanism G the first saw tooth on the barbed pad G10 to engage the blade A6 will cause the lever arm A2 to rock (counterclockwise Figs. 3 and 5) during advancement of the feed carriage F6 with the flat bed F7 to promptly uncouple the feed carriage F6 from the flat bed F7 and allow the latter to continue advancing while the feed carriage and feed cup B cease moving toward the spindle. In this manner the pear between the detecting pad G2 and the feed cup B ceases to move further up onto the tubular shaft S4 and will now be in position thereon for peeling, seed celling and halving.

In connection with the foregoing it will be noted that the operation of the gauging means G and trip mechanism G3 is calculated to uncouple the feed carriage F6 from the positively driven flat bed F7 at a time when the seed cell zone of the pear is in register with the fins f on the tubular shaft S4 of the spindle S. Moreover, the blossom-end trimming fins S5 will be embedded into the calyx end of the pear and assist in coupling the pear to the spindle.

As soon as the flat bed F7 has completed its advancing stroke under the influence of its rack and pinion drive connection with the common drive shaft 8, the cam 38 for the feed mechanism causes withdrawal of the flat bed F7 away from the spindle. Thus the flat bed F7 moves first while the feed carriage F6 slides upon the guide rods 25—25' until the aft end of the feed carriage F6 engages the aft bosses 28' on the flat bed F7. Simultaneous therewith the pin A5 on the feed carriage cams the hooked end A4 of the coupling lever A2 to again set the feed carriage F6 in coupled relation with the flat bed F7 preparatory to the next advancement of the latter toward the spindle. As previously stated the centering means "O" has already been latched in open position relative to the cup B by engagement of the roller 69 with the fixed cam 67 on the frame 1. Now as the flat bed F7 moves back it pulls the feed carriage F6 back with it and the roller B7 on crank arm B6 moves into the declivity B10 of the fixed cam B9 whereupon the oscillatory yoke B1 rocks back into its vertical position. It should here be noted that the extended tail L5 on the latch means L engages the trip lever L6 which is free to rock in the direction of movement of the tail L5 and therefore does not upset the latching engagement between the latch ledge L2 and pin L4. Therefore the centering mechanism "O" remains in open or ineffective position so that the next pear can be deposited into the open upper end of the cup B.

As previously mentioned the clutch C by which the spindle S is controlled is operated from the same common drive shaft 8 which operates the feed mechanism F. In this manner, as soon as the flat bed F7 reaches its full positive stroke toward the spindle S the cam C8 turns the acclivity $d1$ out of engagement with the dog leg lever C5 to set the clutch C in mesh with the sprocket 22. This drivingly connects the spindle S to the common drive shaft 8 for turning the spindle S, its tubular shaft S4 and the pear impaled thereon by reason of its coupled relation therewith through the fins $f$ embedded in the seed cell zone of the pear.

The gauge block G1 (Fig. 5) carries a calyx trimming knife 58, the sharpened end of which is disposed to carve a countersunk cavity into the calyx end of the pear, from the tip of the triangular fins S5 rearwardly during the first revolution of the pear with the spindle.

Also operable on the fruit during the first revolution thereof with the spindle S is a stem-end trimming knife 59 (Figs. 1 and 6). This entails an improved mechanism calculated to trim the first quarter of an inch or so from the stem end of the pear irrespective of what position the stem end of the pear may assume lengthwise of the tubular shaft S4. It will be appreciated, since each pair ceases to advance relative to the spindle shaft S4 when its calyx end engages the detector pad G2, that the stem end of the pear, dependent upon the length of such pear, will assume any one of several positions along the length of the spindle tube S4. In order to assure accurate and uniform trimming of the stem end of each fruit irrespective of its length, we have provided a novel mechanism T for introducing the stem end trimming knife 59 to the fruit and for gauging the disposition of this knife 59 relative to the stem end of the fruit. This stem end trimming mechanism T, now to be explained, is illustrated in Figs. 1 and 6.

The stem end trimming mechanism T comprises a rod T1 guided for sliding movement in a fore to aft direction relative to the machine in a sleeve T2 suitably supported on the frame 1 and partition 15. This sleeve T2 has a curved slot T3 within which is guided a roller T4 extending radially from the rod T1 for turning the latter a quarter of a revolution in the course of its axial movement relative to the sleeve. The roller T4 is urged forwardly relative to the curved slot T3 in sleeve T2 by a push bar T5 running transverse of the machine and having its ends secured to one end of a lever T6 rockably mounted on the frame 1 on either side of the machine. The opposite end of the lever T6 carries a roller T7 engaging a cam T8 secured to the common drive shaft 8. The roller T4 is maintained in yieldable contact with the push bar T5 by means of a compression spring T9 circumscribing the rearmost end of the rod T1 and bearing against the rearmost end of sleeve T2 and a nut T10 on the rear end of the rod T1 to urge the rod T1 in a rearward direction relative to the machine.

The opposite end of the rod T1 extends through the partition 15 and well beyond the same and the rod T1 is disposed with its longitudinal axis slightly above the horizontal plane of the spindle S and to one side thereof. As illustrated in Fig. 1 the rod T1 is in its full forward position when the feed mechanism is withdrawn and in pear receiving position. The foremost end of the rod T1 is threaded to receive an arm T11 which is adjustable axially of the rod T1 and secured in place thereon by lock nuts. The arm T11 extends radially from the rod T1 a distance sufficiently to rest upon the tubular shaft S4 when the rod is rocked a quarter turn toward the same. This motion of the arm T11 and rod T1 is accomplished immediately following the initial withdrawal of the feed cup B from the pear impaled upon the tubular shaft S4. In this connection note in Fig. 1 that the cam T8 is in timed relation with the cam 38 by which the feed mechanism F is operated. The arrangement is such that promptly following the withdrawal of the feed cup B from the pear the cam T8 rocks the lever T6 to move the push bar T5 away from the roller T4. However the roller T4 follows the push bar due to the action of the compression spring T9 and as a result the rod T1 is drawn rearwardly relative to the sleeve T2. Note here that the guide cam slot T3 in the sleeve T2 is such that the rod T1 is swung a quarter turn during the initial movement of the rod under the influence of the spring T9. Thus the arm T11 is rocked into such a position that its free end rests upon the extreme end of the tubular shaft S4, i.e., that end thereof which extends beyond the stem end of a pear fully and properly impaled thereon. Note now that the balance of the splined slot T3 is straight, i.e., parallel to the axis of the rod T1, and consequently the rod T1 is urged rearwardly by the spring T9 to slide the free end of the arm T11 further up upon the spindle shaft S4 until the arm T11 engages the stem end of the pear thereon.

The stem end trimming knife 59 is secured to the arm T11 and therefore the position of the knife 59 is gauged relative to the stem end of the fruit irrespective of the length of the same. The knife 59 consists of a hardened steel blade having its base portion 60 secured to the arm T11 inwardly of the extreme end of the latter and on that side of the arm T11 which engages the pear. The cutting portion of the knife 59 is offset relative to the base portion 60 in the direction of the fruit, preferably ¼ of an inch from the arm T11 so as to cut into the turning fruit the desired distance from the stem end thereof. Consequently, as the fruit begins to turn the knife 59 makes a clean radial cut into the fruit the desired distance inwardly from the stem tip of the pear to remove the stem end therefrom.

As will be seen in Fig. 1, the disposition of the cam T8 relative to the cam 38 of the feed mechanism is such that shortly after arrival of the feed carriage F6 in fruit receiving position the cam lever T6 is rocked back to normal position to urge the push bar T5 forwardly. Thus the push bar T5 moves the roller T4 forwardly and with it the rod T1. This causes the roller T4 to enter the curved portion of the slot T3 to thereby swing the lever T11 a quarter turn away from the spindle S. As seen in Fig. 1 the lever T11 is raised into a vertical position by the foregoing action so that the blade 59 and adjacent end of the lever T11 straddle a stationary clean out finger 61. This clean out finger 61 is suspended from the end of a bracket 62 secured to the partition 15 so as to extend forwardly therefrom. In this manner each time the stem end trimming knife 59 returns to normal or ineffective position (full lines Fig. 1) the clean out finger 61 entering between the knife and adjacent end of the lever T11 cleans out any fruit stem fragments which might adhere or be lodged between the knife and lever T11.

As previously stated and as more particularly pointed out in our aforementioned Patent No. 2,742,067, the fruit is peeled by a peeling head which engages the periphery of the turning pear and travels from the calyx to the stem end thereof while the pear is turned with the spindle shaft S4. After the pear is completely peeled and trimmed at both calyx and stem ends, the clutch C will be disengaged from the sprocket 22 by engagement of the acclivity $d2$ on cam C8 with the dog-leg lever C5 to dwell the spindle S momentarily while the fruit halving knife K cuts into the fruit but partially.

The fruit halving knife K consists of a pair of knives K1—K1' as best illustrated in Fig. 8. There are two such knives K1—K1' for each unit U and each knife constitutes a flat blade disposed in a vertical plane coincident to the axis of the spindle shaft S4. The cutting edge K2—K2' of each knife faces the shaft S4 and is ground to a contour corresponding to the shape of the tubular shaft and the fins *f* as well as the triangular fins S5 thereon. The contour of the cutting edge of each blade is such as to completely sever the pear impaled upon the spindle shaft into two identical halves to thereby release the pear from the spindle.

Each lower and upper blade K1—K1', respectively, has an edge opposite its cutting edge secured to one end of an arm K3—K3', respectively. These arms K3—K3' are secured to upper and lower spaced shafts K4—K4' for rocking movement therewith. The shafts K4—K4' extend transversely of the machine and are suitably journaled on the frame 1 behind the partition 15. The arms K3—K3' extend from the shafts K4—K4' through slots 15k—15k' formed in the partition 15 so that the major portion of each arm as well as the knife blade thereon is disposed in a vertical plane extending through the tubular shaft S4 on the fore side of the partition 15.

The shafts K4—K4' are united for oscillating movement by meshing gear segments K5—K5' so as to rock the arms and their blades toward and from each other in unison. One gear segment K5 has an arm K6 secured thereto for oscillation therewith. This arm K6 has a roller K7 at its free end disposed in a cam track K7' formed in a cam wheel K8 secured to the common drive shaft 8.

As best illustrated in Fig. 8 the operation of the knives K1—K1' is such that they enter the fruit but partially during dwelling of the spindle S as affected by the acclivity *d2* (Fig. 7) of the clutch mechanism C. In other words the knife blades K1—K1' dwell at partial stroke (illustrated by dot-dash lines Fig. 8) during turning of the spindle S as effected by operation of the clutch C when the roller or dog leg C5 thereof is between acclivities *d2* and *d1* of the clutch cam wheel C8. Simultaneous with the entry of the knives K1—K1' partially into the fruit the side walls of the bulb portion of the fruit are engaged by embracing jaws (not shown) to assist the blades in resisting turning of the fruit as well as to firmly embrace the fruit during turning of the seed celling fins *f* relative to the seed cell zone of the fruit to prevent cracking of the fruit. In this manner the seed cells of the fruit are reamed out of the whole fruit by the fins *f* while a countersunk recess is cut into the calyx end of the fruit by the triangular fins S5.

Promptly following the foregoing seed celling operation the acclivity *d1* again rocks the clutch dog leg lever C5 to cause the spindle S to dwell whereupon the fruit embracing jaws, previously mentioned, move away from the fruit and the fruit halving knives again move toward the spindle S (from dot-dash line to dotted line position Fig. 8). Thus the pear on the spindle is halved and free to fall from the spindle. However, to assure removal of the pear halves from the spindle we have provided a knock-off mechanism V now to be explained.

The knock-off mechanism V of the present invention is associated with the lowermost knife K1 as best seen in Figs. 4 and 5. The knock-off mechanism comprises a pair of levers V1—V1' divided lengthwise to straddle the knife blade K1 and thereby to provide pear half knock-off arms on either side of the blade K1. These levers V1—V1' have their lower ends mounted on a pin V4 for rocking movement relative thereto. The pin V4 is mounted in a boss V5 secured to the blade K1 to support the pin V4 in fixed position transversely thereof beyond the lowermost edge of the blade K1. The pair of levers V1—V1' are joined adjacent their upper halves to the legs of a U pad V9 the bight V10 of which is disposed rearwardly of the levers V1—V1' and faces the partition 15. In this manner the levers V1—V1' are joined for rocking movement in unison about the pin V4. The united levers V1—V1' are normally urged toward the partition 15 (clockwise Fig. 4, counterclockwise Fig. 5) by a coil spring V11 circumscribing the pin V4 with one end anchored to the latter and its opposite end engaging one lever V1 to maintain the both levers V1—V1' rearwardly of the blade K1. Rocking movement of the levers V1—V1' in the direction aforesaid by action of the spring V11 is limited by abutment of the bight V10 of the U pad with the arm K3 upon which the blade K1 is secured. From the foregoing it will be seen that the levers of the knock-off mechanism V are moved as a unit with the blade K1 and normally maintained to the rear of the same out of the way of a pear being halved thereby when the knives K1—K1' close upon the pear in the manner as hereinbefore explained.

After the knives K1—K1' completely close, i.e., with their cutting edges against the tubular shaft S4, the core ejecting operation of the machine occurs. This is depicted in Fig. 7. In this view a core ejecting plunger E1 is shown mounted for sliding movement within the central passage of the spindle S and the tubular shaft portion S4 thereof. The aft end of the ejecting plunger E1 is connected by a link E3 to the free end of a rocker arm E4 mounted on a rocker shaft 9 suitably journaled for rocking movement on the frame 1. A companion arm E5 secured to the rocker shaft 9 has a roller E6 at its free end extending into a cam track E7 formed in a cam E8 secured to the common drive shaft 8. The cam track E7 is so configurated that the core ejecting plunger E1 dwells to the rear of the tubular shaft S4 for an appreciable part of each cycle of operation of the machine to allow the stem fibers of the fruit impaled upon the shaft S4 to enter the central passage of the latter as hereinbefore explained. Immediately following halving of the pear impaled upon the shaft S4 and prior to impalement of the next pear onto the same, the cam E8 operates to rock the shaft 9 and rocker arm E4 forwardly to push the ejector rod E1 through the tubular shaft S4 and eject the core or stem fibers therefrom.

Simultaneous with the foregoing core ejecting operation of the rocker arm E3, a push rod V12 is moved forwardly to operate the knock-off mechanism V against the action of its spring V11. This push rod V12 is mounted in the frame 1 for sliding movement to and fro immediately below and in parallelism with the ejecting plunger E1. To this end the rod V12 has its aft end connected by a link V13 to the rocker arm E4 by which the ejecting plunger E1 is reciprocated. The opposite end V14 of the rod V12 is disposed beyond the fore side of the partition 15 just below the base end of the spindle S. The push rod V12 reciprocates in a plane to engage its fore end V14 against the bight V10 of the knock-off mechanism V when the knives K1—K1' are in pear halving position (see dotted line position of knives K1—K1' in Figs. 4 and 8).

It should here be noted that the fore end V14 of the push rod V12 carries a threaded bolt V15 for purposes of adjusting the disposition thereof relative to the bight V10 of the knock-off mechanism. In this manner the push rod V12 can be timed to engage the bight V10 at the right moment and the stroke of the knock-off levers lengthened or shortened as needed.

As previously stated, the pair of levers V1—V1' of the knock-off mechanism are normally urged by spring V11 into a position in which the bight V10 rests upon the arm K3 of the lowermost knife K1. In this position the levers V1—V1' are to the rear of the knife K1 and out of engagement with the pear halved thereby. It should here be noted that the upper or extreme ends of the levers V1—V1' are flared outwardly so that when the knives K1—K1' are in closed position relative to the spindle S, these flared ends of the levers V1—V1' will surround the lower half of the spindle. Now then, when the push rod V12 moves forward to abut the bolt head V15 on its fore end V14 against the bight V10, the flared upper ends of the levers V1—V1' engage the calyx end of each pear half on either side of the closed knives K1—K1' to knock the pear halves off of the spindle and away from the knives. Thus any suction created between the juicy pear halves and the knives is broken and the pear halves can fall by gravity into a suitable trough or conveyor (not shown) below the unit U by which the pear was prepared.

*Operation*

In summary, the machine is set in operation by turning of the common drive shaft 8 to turn all of the cams once in each cycle of operation of the machine. This presupposes that a pear has already been deposited stem end first into the feed cup B while the latter is in vertical position and the feed carriage fully withdrawn relative to the spindle S as seen in full lines Fig. 3. The cam 38 then causes the cross bar 29 to be drawn rearward toward the partition 15 through the medium of lever 35, rod 31 and the rack and pinion connection of the latter with the cross bar 29. This advances the flat bed F7 which is positively connected to the cross bar and with it the feed carriage F6 by reason of its connection to the flat bed by coupling mechanism A.

During initial movement of the feed carriage F6 as aforesaid, the oscillatory yoke B1 rocks from vertical into horizontal position by movement of roller B7 out of the declivity B10 and onto the straight portion of the cam track B8. As the oscillatory carriage swings from vertical to horizontal disposition the tail L5 of latch L engages the fixed lip L6 to release the pear centering means "O" for operation by its tension spring 56b. Thus the fruit centering pads 53 engage the bulb end of the pear to center the same with its stem to blossom axis coincident with the axis of the cup B which is now disposed in axial alignment with the spindle S.

At this state of the cycle of operation the cam C8 is set as shown in Fig. 7 to disengage the clutch C from the sprocket 22 dwelling the spindle S for receipt of a pear calyx end first from the feed mechanism. The feed mechanism thus advances to press the calyx end of the pear into the sharpened open end of the tubular shaft S4 so that the stem or core fibers of the pear enter the hollow passage in shaft S4 while the pear is impaled upon the spindle. When the pear is well on the spindle S (see extreme left hand dotted line disclosure Fig. 3) the roller 69 on the foremost pair of arms 54' of the centering means "O" engages the fixed cam 67 to rock both pairs 55—55' of arms 54' outwardly releasing the bulb end of the pair from between the pads 53. At this time the latch L again sets itself to secure the fruit centering means "O" in open position relative to the cup B.

Advancement of the feed carriage F6 with the flat bed F7 continues by reason of the coupled relation between them by the coupling means A. Thus the pear is pressed by the cup A further up onto the spindle until the fins $f$ register with the seed cell zone of the fruit and the triangular fins S5 enter the blossom or calyx end thereof. As this occurs the butt end of the pear engages the detector pad G2 of the gauging means A to rock the block B1 thereof about the axis of the trunnioned boss G5 against the counterweighing action of arm G9 and its saw-toothed extreme end G10. In this connection it will be noted that a very slight movement of the pad G2 under the influence of the pear raises the extreme end of the arm G9 a substantially greater distance. In this manner the saw-tooth edge G10 of the arm G9 is raised into a position to be engaged by the blade A6 on the coupling lever A2. Irrespective of the length of the pear impaled upon the spindle the first tooth to be engaged by the blade A6 upsets the coupling lever A2 for uncoupling the feed carriage F6 relative to the flat bed F7 of the feed mechanism. Thus the feed carriage F6 stops although the flat bed F7 continues to move toward full stroke position by reason of its direct connection to the common drive shaft 8. In this manner further advancement of the pear relative to the spindle S ceases and the pear is properly positioned thereon with its seed cell zone in register with the fins $f$.

Promptly following reverse movement of the flat bed 7, i.e., withdrawal thereof relative to the spindle S, the rearmost bosses 28' on the flat bed F7 engage the feed carriage F6 to withdraw the latter simultaneous therewith. At this time the pin A5 extending laterally from the flat bed F7 engages the hooked end A4 of the cam lever A2 rocking the latter against the action of its counterweighed end A7. This engages the pin A5 behind the hooked end A4 of lever A2 to again establish coupling relationship between the flat bed F7 and feed cup B preparatory to the advancement of the next pear thereby toward the spindle. As soon as the cup B is withdrawn clear of the stem end of the impaled pear by the foregoing action, the push bar T5 is moved rearwardly relative to the roller T4 on the rod T1 by direct connection with the common drive shaft 8. This releases the rod T1 for withdrawal by its compression spring T9 whereupon the roller T4 traveling the splined portion of slot T3 rocks the rod T1 and lever T11 away from the cleanout finger 61 and against the extreme end of the tubular shaft S4 beyond the stem end of a pear impaled thereon.

Continued movement of the lever T11 rearwardly under the influence of the compression spring T9 causes the extreme end of the lever T11 to engage the stem end of the pear impaled on the shaft S4 to thereby stop further rearward movement of the lever T11. In this manner the stem end trimming knife 59 is properly positioned a predetermined distance inwardly from the stem end of the fruit. At this moment the acclivity $d1$ disengages the lever C5 so as to cause the clutch C to shift into engagement with the sprocket 22 to turn the spindle S.

During revolution of the spindle S the pear is turned by reason of its coupled relation with the shaft S4 through the fins $f$. The calyx trimming knife 58 is positioned against the calyx end of the fruit and the stem end trimming knife 59 is in position inwardly relative to the stem end of the fruit so that upon the first revolution of the pear with the spindle both calyx and stem end of the fruit is trimmed simultaneously.

Promptly following trimming of the fruit the dog-leg C5 is rocked by cam acclivity $d2$ into clutch disengaging position to cause the spindle to stop turning. At this moment the cam K8 causes the two knives K1—K1' to enter the fruit but partially as illustrated in Fig. 8. By that time the acclivity $d2$ on cam C8 will have passed the dog-leg lever C5 to again rock the latter into clutch engaging position to turn the spindle S. Simultaneously therewith fruit embracing pads (not shown) engage the bulb portion of the pear to assist the partially entered knives K1—K1' in restraining turning of the fruit with the spindle. In this manner the seed cell zone of the fruit is reamed out by the fins $f$. Likewise a countersunk recess is cut into the calyx end of the fruit by the triangular fins S5 at the base of the tubular shaft S4. Upon the completion of the foregoing seed celling and calyx recessing operation the cam C8 turns into a position to engage the acclivity $d1$ with the dog-leg lever C5 to operate clutch C for dwelling the spindle S for the final operations on the fruit and preparatory to the impalement of the next fruit on the spindle during the first part of the next cycle of operation of the machine.

At the final dwell of the spindle S the cam K8 continues to move the knives K1—K1' toward the tubular shaft S4. When the sharpened edges of the knives K1—K1' meet the face of the tubular shaft S4 thus halving the fruit on the spindle the knives K1—K1' are in fully closed position. At this moment the core ejector E operates through its cam E8 to urge the plunger E1 through the hollow center of the shaft S4 to remove the stem fibers of the fruit therefrom. Simultaneous with the core ejection operation, push rod V12 is thrust forwardly so that its head end V15 engages the bight V10 on the knock-off levers V1—V1'. Thus the free ends of levers V1—V1' engage both fruit halves and knock them off of the spindle shaft S4 and relative to the side walls of the knives K1—K1'. The pear halves then fall by gravity into a suitable chute (not shown) for conveyance away from the machine while the cam K8 spreads the knives apart, i.e., away from the spindle shaft S4 prior to impalement of the next fruit onto the same.

While the structure herein has been specifically described it will be apparent that the details thereof can be modified, altered or varied in many respects without departing from the spirit of the invention herein disclosed and exemplified. We therefore desire to avail ourselves of all modifications, alterations and/or variations as fairly come within the purview of the appended claims.

What we claim and desire to protect by Letters Patent is:

1. In a pear preparation machine the combination with timed actuating means operating in recurring cycles and a finned spindle for impaling a pear with the seed cell zone of the pear in register with the fins on said spindle, said spindle being in driven relation with said actuating means, a feed bed reciprocable endwise toward and from said spindle in driven relation with said actuating means, a feed carriage mounted on said bed for lost motion movement relative thereto in the direction of reciprocation thereof, a feed cup on said carriage for supporting a pear thereon with its calyx end facing said spindle and its stem-calyx axis in alignment therewith; a latch pin on said feed bed; a coupling lever pivotally mounted on said feed carriage and having a hooked end engageable with said latch pin when said feed carriage is in an advanced position relative to said feed bed for coupling said feed carriage to said feed bed during movement of the latter m toward said spindle whereby said feed cup presses a pear therein onto said spindle; gauge means pivotally mounted adjacent the base of said spindle including a sensing member normally disposed in advance of the base end thereof for engagement by a pear being impaled upon said spindle under the influence of said feed cup; a protruding blade on said coupling lever; and a trip lever secured to said pivotally mounted gauge means for movement therewith, said trip lever having a saw tooth edge located normally free of the protruding blade on said coupling lever, said trip lever being moved to bring the saw tooth edge thereof into engagement with said protruding blade upon movement of the trip lever by the engagement of a pear with said sensing member, thereby disengaging the hooked end of said coupling lever from said latch pin and staying further movement of said feed carriage and the feed cup thereon toward the spindle with said reciprocating feed bed.

2. In a pear preparation machine the combination with timed actuating means operating in recurring cycles and a finned spindle for impaling a pear with the seed cell zone of the pear in register with the fins on said spindle, the latter being in driven relation with the actuating means: a feed bed reciprocable endwise toward and from said spindle and in driven relation with the actuating means; a feed carriage mounted on said bed for lost motion movement relative thereto in the direction of reciprocation thereof; a feed cup on said carriage for supporting a pear thereon with its stem-calyx axis in alignment with the spindle; means for coupling said feed carriage to said feed bed including a coupling lever pivotally mounted on said feed carriage, a portion of said coupling lever being formed for releasable coupling engagement with the bed; gauge means pivotally mounted adjacent the base of said spindle; a sensing member on said gauge means positioned in the path of a pear being impaled upon said spindle and resiliently biased towards said pear; a trip lever secured to said gauge means for movement therewith, said trip lever having a saw toothed edge thereon; and a blade protruding from said coupling lever and positionable within the path of the saw toothed lever edge upon the movement of said trip lever in response to the engagement of said sensing member with a pear being impaled on the spindle by said feed carriage thereby to arrest further impalement of the pear on the spindle.

3. In a pear preparation machine the combination with timed actuating means operating in recurring cycles and a finned spindle for impaling a pear, said spindle being in driven relation with the actuating means: a feed bed reciprocating endwise toward and from said spindle and in driven relation with the actuating means; a feed carriage mounted on said feed bed for lost motion movement therewith in the direction of reciprocation thereof; coupling means releasably coupling the carriage in advanced position on said feed bed during movement of said bed toward said spindle; a yoke journaled on said carriage for oscillation about an axis transverse to the direction of reciprocation of said carriage; a feed cup mounted on said carriage for movement from a horizontal position with a pear therein presented butt end first coaxial with said spindle to a vertical position perpendicular thereto and forwardly thereof when said carriage is withdrawn relative to said spindle; a stationary cam adjacent the path of reciprocation of said feed carriage; a cam roller on said feed carriage engaging said cam for oscillating said feed cup between vertical and horizontal positions during reciprocation of said feed bed and feed carriage toward and from said spindle, and a trip mechanism between said spindle and said reciprocating feed carriage comprising a biased trip lever having a saw toothed upper edge disposed normally clear of the path of movement of said coupling means; a lever arm connected to said trip lever and having its free end disposed adjacent said spindle; a pear sensing member on the free end of said lever arm forwardly of the base of said spindle and positioned in the path of movement of the butt end of a pear being impaled upon the spindle to thereby rock said trip lever, swinging its saw tooth upper edge into engagement with said coupling means thereby releasing the coupling means to uncouple said feed carriage from said reciprocating feed bed and arrest further advance of a pear being impaled on the spindle.

4. In a pear preparation machine of the type having a fruit turning spindle, the sub-combination therewith of a reciprocating feed bed arranged for movement endwise toward and from the fore end of said spindle, actuating means operating in recurring cycles in driving relation with the spindle and feed bed: a feed cariage mounted on said feed bed for lost motion reciprocating movement therewith; a coupling lever pivotally mounted on said feed carriage; a protruding blade secured to said coupling lever for movement therewith; a latch hook on said coupling lever; a latch pin on said feed bed for engagement by the hook on said coupling lever when said feed carriage is in an advanced position on said feed bed for advancing said feed carriage toward said spindle therewith; a fruit supporting cup on said feed carriage for receiving a pear stem end first and for advancing such pear butt end first toward said spindle for impalement thereon; a fruit sensing member mounted at the base end of said spindle and free for limited movement upon engagement thereof by a pair being impaled upon said spindle; a trip lever pivotally mounted adjacent said spindle and operatively connected to said fruit sensing member for movement therewith; and a barbed free end portion on said trip lever normally disposed laterally beyond the path of movement of said coupling lever, said trip lever being mounted for swinging movement by the force of a pair being impaled on the spindle engaging said fruit sensing member, thereby swinging the barbed portion of the trip lever into the path of movement of the depending blade on the coupling lever, actuating said coupling lever to uncouple said feed carriage from said reciprocating feed bed and arrest further advance of the pear on the spindle.

5. In a pear preparation machine of the type having a stationary frame a fruit turning spindle journaled in said frame and secured thereto against axial movement, a reciprocating feed bed mounted on said frame and arranged for movement endwise toward and from said spindle, and actuating means operating in recurring cycles in driving relation with the spindle and the feed bed: a feed carriage mounted on said feed bed for limited lost motion movement therewith in the direction of feed bed reciprocation; a latch latchingly interconnecting said feed bed and carriage when said carriage is in an advanced position relative to said feed bed; pear holding means on said carriage for holding a pear butt end first, with its stem calyx axis aligned with the spindle for coaxial impalement thereon; a fruit sensing member mounted for limited fore-and-aft movement in the path of the butt end of a pear being impaled on the spindle; means biasing said fruit sensing member toward a pear being impaled on the spindle; and latch release means mounted normally clear of the latch and operatively connected to said sensing member for movement by said member into the path of the latch upon movement of said sensing member by its engagement by the butt end of a pear being impaled on the spindle, thereby unlatching the latch and releasing the carriage from the advancing bed whereby advance of the pear onto the spindle is arrested.

6. In a pear preparation machine of the type having a stationary frame, a fruit turning spindle journaled in said frame and secured thereto against axial movement, a reciprocating feed bed mounted on said frame and arranged for movement endwise toward and from said spindle, and actuating means operating in recurring cycles in driving relation with the spindle and feed bed: a feed carriage mounted on said feed bed for limited lost motion movement therewith; latch means releasably latching the carriage to said bed when said carriage is in an advanced position relative to said feed bed; a feed cup on said feed carriage constructed and arranged to hold a pear with its stem-calyx axis aligned with the spindle and its butt end toward said spindle for impalement butt-end-first thereon; a latch tripping mechanism pivotally mounted on said frame adjacent said spindle; a fruit sensing member on the trip mechanism disposed in the path of movement of a pear being impaled on the spindle, said sensing member being movable by a pear engaging the same, thereby actuating the latch tripping means and unlatching said feed carriage from said feed bed; a stationary guide sleeve mounted on said frame parallel to said spindle to one side and rearwardly thereof; a push rod mounted for sliding movement in said sleeve and having its fore end extended beyond the fruit receiving end of said spindle; a gauging arm secured to the fore end of said push rod and extending transversely therefrom a distance sufficient to overlie the stem end of a pear impaled on the spindle; a stem end trimming knife secured to the free end of said arm and offset therefrom in the direction of the butt end of a pear impaled on said spindle a distance equal to the thickness of the stem end portion of a pear to be removed thereby, said sleeve having a cam slot formed therein lengthwise thereof and terminating at its fore end in a curved cam portion; a roller on said push rod riding in said slot; a push member operatively connected to said actuating means and to said push rod for urging the latter endwise thereby carrying said roller into the curved portion of said slot to rock the push rod and swing the blade supporting arm thereon out of engagement with said spindle and clear of the path of a pear being impaled on the spindle; and a spring urging the push rod in a direction to carry the gauging arm and knife toward the butt end of a pear impaled upon the spindle upon completion of each impalement of a pear thereon, whereby the roller is urged into and along the straight portion of said slot to turn said push rod and swing said arm into a position in which its free end bears on the stem end of a pear impaled on and turned by the spindle, whereby the knife cuts a slice from the stem end of the pear of a thickness determined by the spacing of the knife from its supporting arm.

7. In a pear preparation machine of the type having a stationary frame a fruit turning spindle journaled in said frame and secured thereto against axial movement, a reciprocating feed bed arranged for movement endwise toward and from said spindle, and actuating means operating in recurring cycles in driving relation with the spindle and feed bed: a feed carriage mounted on said feed bed for limited lost motion movement therewith; latch means releasably latching the carriage in an advanced position on the feed bed; a latch tripping mechanism pivotally mounted adjacent said spindle; latch release means mounted for movement by a pear being impaled on the spindle for unlatching said feed carriage from said feed bed; a push rod mounted for sliding movement laterally beyond the path of a pear being impaled on the spindle; a gauging arm carried by said push rod and movable therewith toward the fruit receiving end of the spindle a sufficient distance to clear the stem end of a pear impaled on the spindle, and extending transversely therefrom a distance sufficient to overlie the stem end of a pear impaled on the spindle; a stem end trimming knife secured to the free end of said arm and offset therefrom in the direction of the butt end of a pear impaled on said spindle a distance equal to the thickness of the stem end portion of a pear to be removed thereby; a push member operatively connected to said actuating means and operatively engaging the push rod at a predetermined point in each cycle of the actuating means, thereby moving the blade supporting arm clear of the path of a pear being impaled thereon; and a compression spring urging the push rod in a direction opposite to that of the push member, thereby swinging the gauging arm over the stem end of a pear impaled on and turning with the spindle, said spring urging the knife against the stem end of such impaled pear, cutting a slice from the stem end of the pear of a thickness determined by the spacing of the knife from its supporting arm.

8. In a pear preparation machine of the type having a stationary frame a fruit turning spindle journaled in said frame and secured thereto against axial movement, a reciprocating feed mechanism for impaling a pear onto said spindle calyx end first, and timed actuating means operating in recurring cycles in driving relation with the spindle and feed mechanism: a stem end trimmer comprising a stationary guide sleeve mounted on said frame and arranged parallel to said spindle and laterally clear of the path of a pear being impaled on the spindle; a push rod mounted for sliding movement in said sleeve and having its fore end extended from the base end toward the fruit impaling end of said spindle; a blade support and gauging arm secured to the fore end of said push rod, said arm being of a length to overlie the stem end of a pear impaled on the spindle; a knife secured to said arm and spaced therefrom a predetermined distance in the direction of said spindle, said sleeve having a cam slot formed lengthwise therein and provided with a straight portion terminating at its fore end in a curved portion; a roller on said push rod riding in said slot; a push rod actuating member operatively connected with said timed actuating means for holding the push rod forward with the roller in the curved portion of the slot in said sleeve thereby rocking said push rod and swinging the arm thereon away from said spindle during the impaling of a pear thereon; and a spring urging the push rod rearwardly upon each withdrawal of the push rod actuating member upon completion of the impaling of a pear on the spindle, whereby the roller is carried into the straight portion of said slot, turning said push rod and swinging said arm over the stem end of a pear impaled on said spindle, the spring urging the free end of the arm into gauging relation with the stem end of the impaled pear turning with the spindle, whereby the blade trims a slice from the stem end of the pear, the thickness of the slice being gauged by the spacing of the blade from the gauging arm.

9. In a pear preparation machine of the type having a stationary frame a fruit turning spindle journaled in said frame and secured thereto against axial movement, a reciprocating feed mechanism for impaling a pear onto said spindle calyx end first and timed actuating means operating in recurring cycles in driving relation with the spindle and feed mechanism: a stem end trimmer comprising a gauging arm support member on said frame mounted laterally clear of a pear impaled on the spindle, the fore end of said support member extending beyond the fruit impaling end of said spindle; a blade support and gauging arm secured to said support member; cam means mounted to engage said gauging arm support member on a movement thereof lengthwise of the spindle for swinging the gauging arm between a position clear of a pear impaled on the spindle to a position overlying the stem end of a pear impaled on the spindle; a knife secured to said gauging arm and spaced therefrom a predetermined distance in the direction of said spindle; an actuating member operatively connected with said actuating means for holding the gauging arm support member and the gauging arm thereon forward during the impaling of a pear on the spindle whereby the cam means swings the gauging arm away from said spindle; and return means urging the gauging arm support member and the gauging arm thereon rearwardly upon each withdrawal of the actuating member upon completion of the impaling of a pear on the spindle, whereby the cam means swings the gauging arm over the stem end of a pear impaled on the spindle, the return means urging the free end of the gauging arm into gauging relation with the stem end of the impaled pear turning with the spindle whereby the blade trims a slice from the stem end of the pear, the thickness of the slice being gauged by the spacing of the blade from the gauging arm.

10. In a pear preparation machine of the type having a stationary frame a fruit turning spindle journaled in said frame and secured thereto against axial movement, a reciprocating feed mechanism for impaling a pear onto said spindle calyx end first and timed actuating means operating in recurring cycles in driving relation with the spindle and feed mechanism: a stem end trimmer comprising a gauging arm support member mounted on said frame laterally clear of the path of a pear being impaled on the spindle and movable from a position forwardly of the fruit impaling end of the spindle toward the base end thereof; a blade support and gauging arm carried by said arm support member, said arm being movable from a position clear of the path of a pear being impaled on the spindle to a position overlying the stem end of a pear impaled on the spindle; a knife secured to said arm and spaced therefrom in the direction of said spindle a predetermined distance; cam means moving said arm outwardly clear of the path of a pear being impaled on the spindle upon a forward movement of the arm support member and arm, said cam means moving the arm inwardly to a position overlying the stem end of a pear impaled on the spindle upon a rearward movement of the arm support member and arm; actuating means operatively connected with said timed actuating means for holding the arm support member and the arm thereon forwardly during the impaling of a pear on the spindle, whereby the cam means moves the arm away from said spindle during the impaling of a pear thereon; and return means urging the arm support member and arm rearwardly upon completion of the impaling of a pear on the spindle whereby the cam means moves said arm inwardly over the stem end of a pear impaled on said spindle, the return means urging the arm into gauging relation with the stem end of the impaled pear turning with the spindle whereby the blade trims a slice from the stem end of the pear, the thickness of the slice being gauged by the spacing of the blade from the gauging arm.

11. In a pear preparation machine including a stationary frame, a fruit turning spindle journaled in said frame and secured thereto against axial movement, pear feeding means for impaling the same butt end first on said spindle, a common drive mechanism operating in recurring cycles for reciprocating said pear supporting means to and from said spindle, and clutch means connecting said common drive and said spindle for turning the latter and a pear thereon intermittently during each cycle of operation of the common drive mechanism: a pair of pear halving knives mounted on said frame and disposed in a common plane coincident with the axis of said spindle; means connected to said common drive mechanism moving said knives alternately toward and from said spindle and each other at predetermined points in each cycle of operation of the drive mechanism to sever a pear impaled on the spindle into halves; a pear knock-off mechanism operating in timed relation with said halving knives comprising a pin mounted transversely of one of said knives beyond the portion thereof entering a pear in severing the latter; a pair of pear knockoff levers pivotally mounted on said pin with one of said levers on each side of its supporting knife and within swinging distance of a pear impaled on the spindle and severed by the knives; spring means normally urging said levers clear of the portion of the knives occupied by a pear severed by the knives; a lever actuating member mounted on said frame for movement toward and from the levers; and means operatively connecting said common drive mechanism and said lever actuating member for moving the latter toward said pair of levers upon the completion of each pear severing movement of the knives, thereby swinging the levers into engagement with a severed pear remaining on the knives for knocking the pear halves therefrom.

12. In a pear preparation machine including a stationary frame, a fruit turning spindle journaled in said frame and secured thereto against axial movement, pear feeding means for impaling a pear on said spindle, and a common drive mechanism operating in recurring cycles and operatively connected to said spindle and feeding means: a pair of pear halving knives mounted on said frame and disposed in a common plane coincident with, and on opposite sides of the axis of said spindle; means connected to said common drive mechanism moving said knives successively toward and from said spindle and each other at predetermined points in each cycle of operation of the drive mechanism to sever a pear impaled on the spindle, a pair of pear knockoff levers pivotally mounted on one of said knives with one of said levers on each side of its supporting knife and within swinging distance of a pear impaled on the spindle and severed by the knives; and lever actuating means mounted on said frame and operatively connected to said common drive mechanism for movement into operating relation with said levers upon the completion of each pear severing movement of the knives, thereby swinging the levers into engagement with the halves of a severed pear remaining on the knives for knocking the pear halves therefrom.

13. In a pear preparation machine including a stationary frame; a fruit turning spindle journaled in said frame and secured thereto against axial movement, pear feeding means for impaling a pear on said spindle, and a common drive mechanism operating in recurring cycles and operatively connected to said spindle and feeding means: a pair of pear halving knives mounted on said frame and disposed in a common plane coincident with, and on opposite sides of the axis of said spindle; means connected to said common drive mechanism moving said knives toward and from said spindle and each other at predetermined points in each cycle of operation of the drive mechanism to sever a pear impaled on the spindle; pear knockoff means mounted to straddle one of said knives and movable from a position clear of a pear impaled on the spindle and severed by the knives to a position engaging the severed halves of such pear; and actuating means operatively connected to said common drive mechanism and moved into operating relation with said knockoff means upon the completion of each pear severing movement of the knives, thereby moving the knockoff means into engagement with the halves of a severed pear remaining on the knives for knocking the pear halves therefrom.

14. In a pear preparation machine of the type having a stationary frame, fruit turning spindle journaled in said frame and secured thereto against axial movement, a feed bed mounted for reciprocating movement toward and from said spindle along a path parallel to the spindle, and actuating means operating in recurring cycles in driving relation with the spindle and feed bed: a feed carriage mounted on said feed bed for limited lost motion movement therewith; latch means releasably latching the carriage to said feed bed during its travel towards said spindle; a feed cup on said feed carriage constructed and arranged to hold a pear with its stem-calyx axis aligned with the spindle and its butt end toward said spindle for impalement butt-end-first thereon; a latch tripping mechanism mounted on said frame adjacent said spindle; and a fruit sensing member on the trip mechanism disposed in the path of movement of a pear being impaled on the spindle, said sensing member being movable by a pear engaging the same thereby actuating the latch tripping mechanism and unlatching said feed carriage from said feed bed whereby advance of the pear on the spindle is arrested.

15. In a pear preparation machine of the type having a stationary frame, a fruit turning spindle journaled in said frame and secured thereto against axial movement, a reciprocating feed member arranged for movement endwise toward and from said spindle, and actuating means operating in recurring cycles in driving relation with the spindle and feed member: pear holding means constructed and arranged to hold a pear with its stem-calyx axis aligned with the spindle and its butt end toward said spindle for impalement butt-end-first thereon; means releasably latching the pear holding means to the reciprocating feed member for movement toward the spindle therewith; a fruit sensing element controlled by the butt end of a pear being impaled on the spindle; and trip means actuated by said sensing element at a predetermined point of advance of the butt end of the pear on the spindle, thereby unlatching said pear holding means from said feed member, whereby advance of the pear on the spindle is arrested.

16. In a pear preparation machine having timed actuating means operating in recurring cycles, a stationary frame, a fruit turning spindle journaled in said frame and secured thereto against axial movement, and a pear feed mechanism both of the latter having driven connection with said actuating means: a stem end trimmer mounted on said frame and comprising a gauging arm arranged to overlie the stem end of a pear impaled on the spindle; cam means moving said arm into gauging contact with the stem end of a pear on said spindle; a stem end trimming knife on said arm offset from the side of said arm toward a pear impaled upon said spindle, whereby the knife trims a uniform slice from the stem end of the pear; means moving the arm transversely of its length upon completion of a pear trimming operation; and a cleaner passing between the arm and the knife during such transverse movement of the arm to clear away any pear trimmings remaining therebetween.

17. A pear processing machine comprising: a stationary frame; a pear impaling spindle journaled in said frame and secured thereto against axial movement; a bed mounted on said frame for movement to and from said spindle in the direction of the axis thereof; a carriage mounted on said bed for movement relative thereto in the direction of the axis of said spindle; releasable latching means operatively associated with said bed and said carriage; a pear receiving and feeding cup mounted on said carriage for coaxial disposition relative to said spindle and arranged to impale a pear on said spindle coaxially therewith; a latching trip and pear sensing member mounted on said frame immediately adjacent said spindle and in the path of a pear impaled thereon, said trip and sensing member being movable to and away from said carriage and being resiliently biased towards said carriage; and means responsive to the movement of said trip and sensing member away from said carriage for releasing said latching means and arresting the further movement of said carriage towards said trip member.

18. A pear processing machine comprising: a stationary frame; a hollow spindle journaled in said frame cantileverwise and secured thereto against axial movement, said spindle being provided at a point remote from its free end with a plurality of radially extending fins; a carriage mounted on said frame for movement in parallelism with said spindle and for impaling a pear on said spindle coaxially therewith over said fins; pear sensing means mounted on said frame rearwardly of said fins and in the path of a pear impaled on said spindle, said pear sensing means being movable towards and away from said fins; means for resiliently urging said sensing means towards said fins; means responsive to the movement of said sensing means axially away from said fins as a result of the contact of a pear with said sensing means for arresting the further movement of said carriage towards said sensing means thereby to locate said pear on said spindle with reference to said sensing means; a trimming knife carriage mounted on said frame adjacent said spindle and for movement along said spindle; a pear stem-end sensing member mounted on said carriage; means for moving said stem-end sensing member into a position forwardly of the stem end of a pear impaled on said spindle over said fins; a stem-end trimming knife mounted on said stem-end sensing member with its cutting edge disposed rearwardly thereof; and means for moving said stem-end sensing member into resilient engagement with the stem end of said pear after the said further movement of said carriage has been arrested, thereby to cut a portion of predetermined length from the stem end of said pear irrespective of the size thereof.

References Cited in the file of this patent

UNITED STATES PATENTS

| | | |
|---|---|---|
| 892,393 | Boutell | July 7, 1908 |
| 987,108 | Boutell | Mar. 21, 1911 |
| 1,217,791 | Luther | Feb. 27, 1917 |
| 1,745,158 | Fish | Jan. 28, 1930 |
| 2,056,413 | Thompson et al. | Oct. 6, 1936 |
| 2,187,075 | Coons | Jan. 16, 1940 |
| 2,261,150 | Ewald | Nov. 4, 1941 |
| 2,321,590 | Ewald | June 15, 1943 |
| 2,632,552 | Coons | Mar. 24, 1953 |
| 2,664,129 | Coons | Dec. 29, 1953 |